US005959830A

United States Patent [19]
Inagawa et al.

[11] Patent Number: 5,959,830
[45] Date of Patent: Sep. 28, 1999

[54] ELECTRIC DOUBLE LAYER CAPACITOR

[75] Inventors: Masako Inagawa; Munekazu Aoki; Keitaro Katsu, all of Tokyo, Japan

[73] Assignee: NEC Corporation, Tokyo, Japan

[21] Appl. No.: 08/903,435

[22] Filed: Jul. 30, 1997

[30]     Foreign Application Priority Data

Jul. 30, 1996  [JP]  Japan .................................. 8-200652

[51] Int. Cl.$^6$ ............................. H01G 9/00; B65D 51/16
[52] U.S. Cl. ........................ 361/502; 361/521; 361/534; 361/522
[58] Field of Search .................................. 361/502, 503, 361/512, 520, 521, 522, 533–534, 531, 537, 538, 540, 541; 29/25.03

[56]              References Cited

U.S. PATENT DOCUMENTS

| 3,652,902 | 3/1972 | Hart et al. | 361/502 |
|---|---|---|---|
| 4,023,079 | 5/1977 | Selover, Jr. et al. | 361/502 |
| 5,121,301 | 6/1992 | Kurabayashi et al. | 361/502 |
| 5,227,960 | 7/1993 | Kunishi et al. | 361/502 |
| 5,367,431 | 11/1994 | Kunishi et al. | 361/502 |
| 5,428,501 | 6/1995 | Bruder | 361/535 |

FOREIGN PATENT DOCUMENTS

| 63-9125 | 1/1988 | Japan . |
|---|---|---|
| 4-72617 | 6/1992 | Japan . |
| 4-288361 | 10/1992 | Japan . |
| 6-45192 | 2/1994 | Japan . |
| 7-130584 | 5/1995 | Japan . |

*Primary Examiner*—Kristine Kincaid
*Assistant Examiner*—Anthony Dinkins
*Attorney, Agent, or Firm*—Young & Thompson

[57]              ABSTRACT

A stack type electric double layer capacitor includes a plurality of unit cells, each with a pair of polarizing electrodes facing each other across a porous separator, a pair of current collecting members, and a gasket surrounding the electrodes and current collecting members. The gasket has a heat radiation notch in the direction parallel to or perpendicular to the stacking direction. This prevents heat from accumulating in the capacitor at the time of rapid charge and discharge, and thereby enhances the reliability of the capacitor.

5 Claims, 8 Drawing Sheets

ELECTRIC DOUBLE LAYER CAPACITOR

BACKGROUND OF THE INVENTION

The present invention relates to an electric double layer capacitor and, more particularly, to a stack type electric double layer capacitor having polarizing electrodes implemented by Activated Carbon/Carbon composite (AC/C composite).

An electric double layer capacitor has a static capacity greater than one available with an aluminum electrolytic capacitor, and does not need a charge/discharge control circuit included in a secondary battery. With these advantages, this type of capacitor has customarily been used mainly to back up a memory included in an electronic apparatus and to start up a motor, actuator or similar mechanical part instantaneously at the time of power failure. Polarizing electrodes built in the capacitor are generally implemented as AC/C composite electrodes having a broad surface area, e.g., a paste of a mixture of powdery activated charcoal and electrolyte or activated charcoal fibers impregnated with an electrolyte. There has recently been proposed polarizing electrodes formed of an activated carbon/polyacene composite, as taught in Japanese Patent Laid-Open Publication No. 4-288361. This composite is produced by causing a mixture of powder or fibers of AC/C composite and granular or powdery phenol resin to set by heat, and then heating it in a nonoxidizing atmosphere. An electric double layer capacitor with this kind of polarizing electrodes can be rapidly charged and discharged by a current of the order of several amperes to several thousand amperes.

The electric double layer capacitor is often used as an instantaneous energy source for a motor, actuator or similar mechanical part needing great energy at the time of start-up. The capacitor therefore must be highly reliable, small size, and light weight. The problem with the conventional capacitor which is hermetically sealed is that when it is rapidly charged or discharged by a current as great as several amperes to several thousand amperes, Joule heat accumulates in the capacitor and deteriorates reliability. While Japanese Utility Model Laid-Open Publication No. 63-9125, for example, discloses an electric double layer capacitor for solving the above problem, it has the following problems (1)–(3) left unsolved.

(1) A heat radiation efficiency and therefore reliability achievable when the capacitor is low.

(2) The capacitor is large size and heavy weight.

(3) The capacitor cannot enhance productivity.

Why the problems (1)–(3) are brought about will be discussed specifically later.

SUMMARY OF THE INVENTION

It is therefore an object of the present invention to provide an electric double layer capacitor which is highly reliable, small size and light weight and enhances productivity.

In accordance with the present invention, in an electric double layer capacitor having a stack of unit cells, the unit cells each has a pair of polarizing electrodes facing each other with the intermediary of a porous separator, a pair of current collecting members each contacting a surface of the respective polarizing electrode opposite to a surface facing the porous separator, a gasket surrounding the polarizing electrodes, and a hole for heat radiation formed in the gasket and extending in the direction parallel to or perpendicular to the stacking direction of the unit cells.

Also, in accordance with the present invention, in an electric double layer capacitor having a stack of unit cells, the unit cells each has a pair of polarizing electrodes facing each other with the intermediary of a porous separator, a pair of current collecting members each contacting a surface of the respective polarizing electrode opposite to a surface facing the porous separator, a gasket surrounding the polarizing electrodes, and a partition partitioning a space surrounded by the gasket into a plurality of spaces independent of each other in a plane perpendicular to the stacking direction. The partition includes an area increasing portion positioned such that when the unit cells are stacked, the area increasing portion aligns with the other area increasing portions in the direction parallel to or perpendicular to the stacking direction of the unit cells.

BRIEF DESCRIPTION OF THE DRAWINGS

The above and other objects, features and advantages of the present invention will become apparent from the following detailed description taken with the accompanying drawings in which.

In the drawings, identical reference numerals designate identical structural elements.

DESCRIPTION OF THE PREFERRED EMBODIMENTS

To better understand the present invention, brief reference will be made to a conventional electric double layer capacitor. Generally, this type of capacitor has a plurality unit cells or unit capacitors serially stacked one upon the other.

Figure 1:
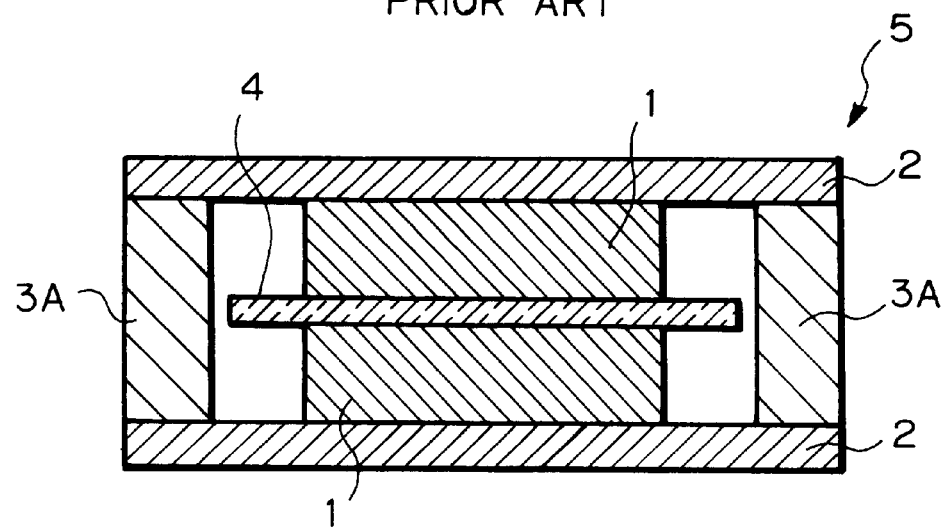
FIG. 1 is a section showing a unit cell included in a conventional electric double layer capacitor.

FIG. 1 shows a unit cell 5 included in the conventional capacitor. As shown, the unit cell 5 includes a pair of polarizing electrodes 1 formed of solid activated charcoal, e.g., an activated charcoal/polyacene composite as taught in Japanese Patent Laid-Open Publication No. 4-288361 mentioned earlier. Current collecting members 2 are respectively adhered to the electrodes 1, and each is formed of rubber or plastic containing conductive carbon. The electrodes 1 face each other across a porous separator 4. A frame-like gasket 3A shown in FIG. 2 and the current collecting members 2 seal an electrolyte in the unit cell 5.

Figure 3:
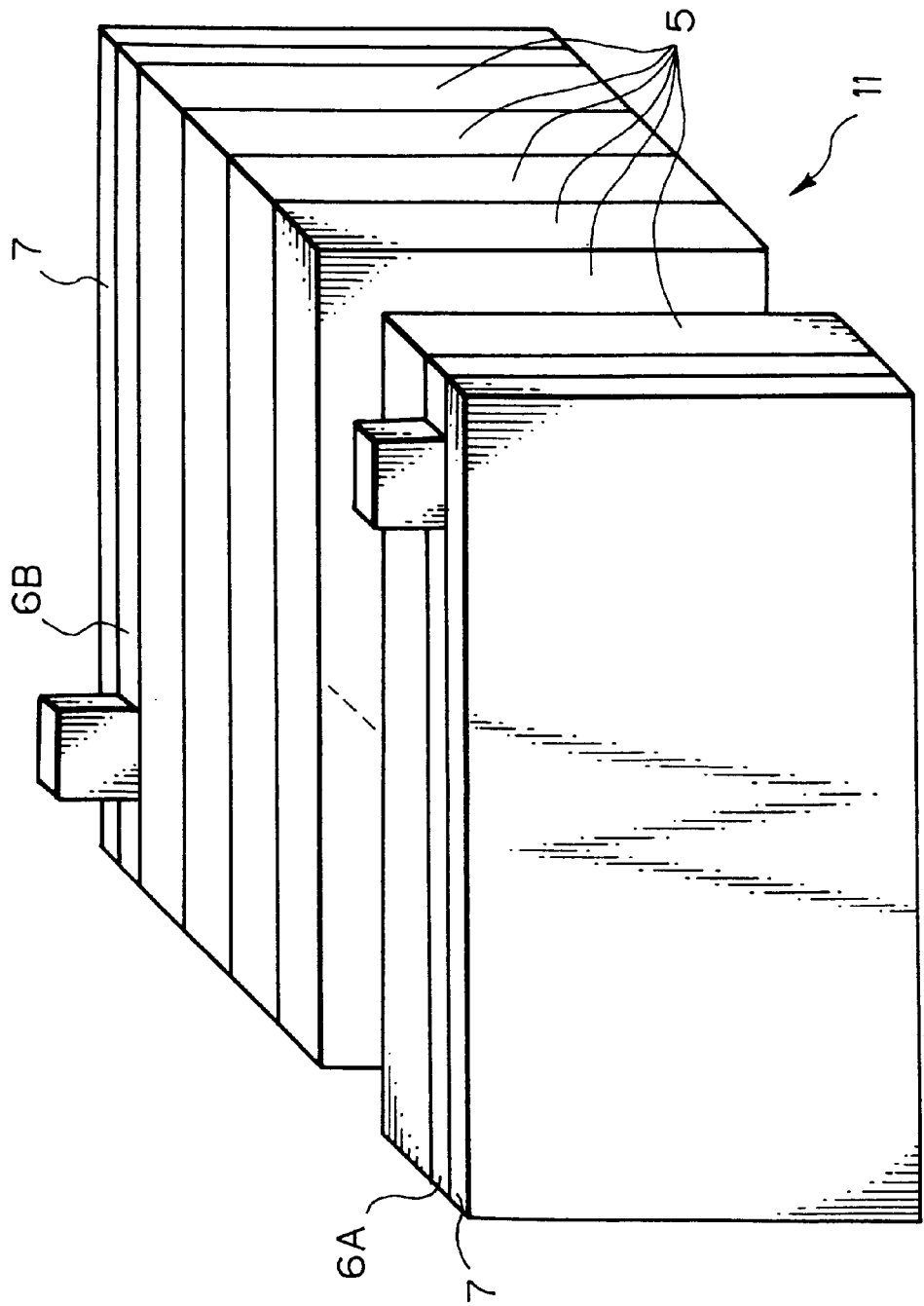
FIG. 3 is a perspective view showing an electric double layer capacitor including the gasket of FIG. 2 and representative of a first comparative example.

The voltage which the above capacitor withstands is limited by the electrolytic voltage of the electrolyte. As shown in FIG. 3, a plurality of unit cells 5 implementing a desired voltage are serially stacked one upon the other, constituting a cell stack 11. The cell stack 11 is held between and pressed by a pair of plates 7 in order to reduce contact resistance between the unit cells 5 and between the unit cells 5 and terminal electrodes 6A and 6B.

This type of capacitor is often used as an instantaneous energy source for a motor, actuator or similar mechanical part needing great energy at the time of start-up, as stated earlier. The capacitor therefore must be highly reliable, small size, and light weight. The problem with the hermetically sealed capacitor shown in FIG. 3 is that when it is rapidly charged or discharged by a current as great as several amperes to several thousand amperes, Joule heat accumulates in the cell stack 11 and deteriorates reliability.

Figure 4:
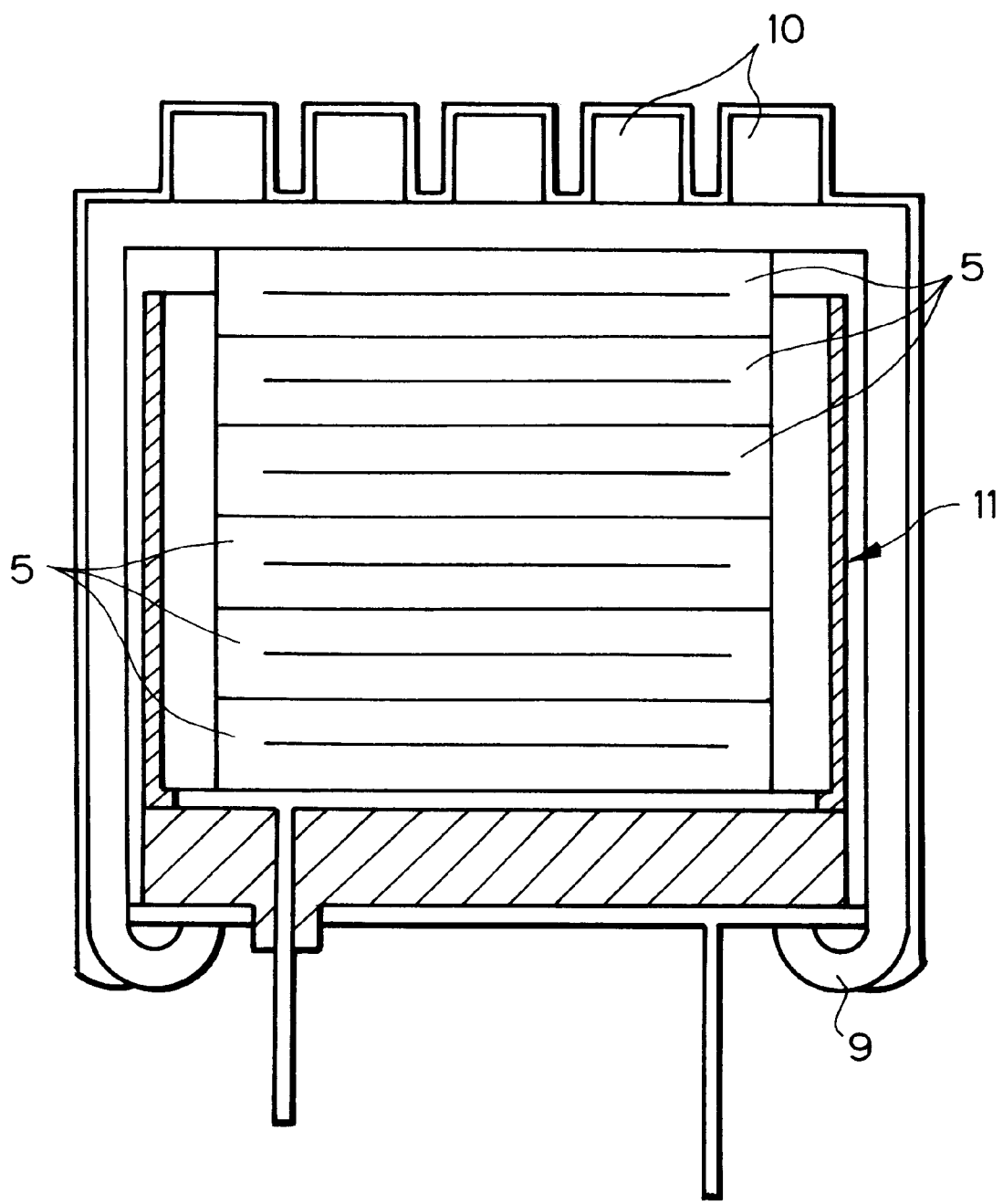
FIG. 4 is a section showing another conventional electric double layer capacitor including a heat radiator.

FIG. 4 shows an electric double layer capacitor proposed in Japanese Utility Model Laid-Open Publication No. 63-9125 as a solution to the above problem. As shown, the capacitor includes a heat radiator 10 forming a part of a casing 9. The cell stack 11 is accommodated in the casing 9. When the capacitor is discharged, heat generated in the cell stack 11 is transferred to the outside via the heat radiator 10. However, this kind of configuration has the problems (1) to (3) stated earlier. The problems (1) to (3) will be discussed specifically hereinafter.

The problem (1) is that the heat radiation efficiency and therefore reliability is low for the following reason. The heat radiator 10 is welded to a part of the casing 9 which includes terminals. As shown in FIG. 4, the heat radiator 10 is welded to a surface of the casing 9 exhibiting the greatest heat radiation effect, but not provided on the surface opposite to the above surface. Then, heat accumulated in the cell stack 11 at the time of discharge is radiated at a different degree via each of the surface with the heat radiator 10 and the surface without the heat radiator 10. As a result, a temperature gradient occurs in the cell stack 11 and causes a gradient to occur in the ESR (Equivalent Series Resistance) of the stack 11 in the direction of heat accumulation. The gradient of the ESR results in an irregular potential distribution (voltage held by the individual unit cell 5). That is, the temperature is low at the side where heat is radiated due to the heat radiator 10, but high at the other side; the unit cells 5 at the higher temperature side have their allowable voltage lowered. When the capacitor is charged in such a condition, a heavy load acts on some of the unit cells 5 and causes them to break, resulting in the chain breakage of the entire stack 11. Even if another heat radiator 10 is provided on the other side of the cell stack 11, the temperature gradient occurs between the inside and the outside because heat accumulates within the cell stack 11.

The problem (2) is that the capacitor is large size and heavy weight. This is because the heat radiator 10 provided on the outside of the casing 9 must have a heat radiation efficiency high enough to radiate the whole heat accumulated in the cell stack 11. Such a heat radiation efficiency is not achievable unless the heat radiator 10 is formed of heavy metal and provided with a substantial thickness.

The problem (3) is that it is difficult to improve productivity because the heat radiator 10 must be welded to the casing 9 afterwards. The heat radiator 10 may be welded to the casing 9 beforehand. This kind of scheme, however, makes it difficult to uniformly pressurize the entire cell stack 11 in the stacking direction of the unit cells 5 later.

Preferred embodiments of the electric double layer capacitor in accordance with the present invention will be described hereinafter.

1st Embodiment

Figure 5:
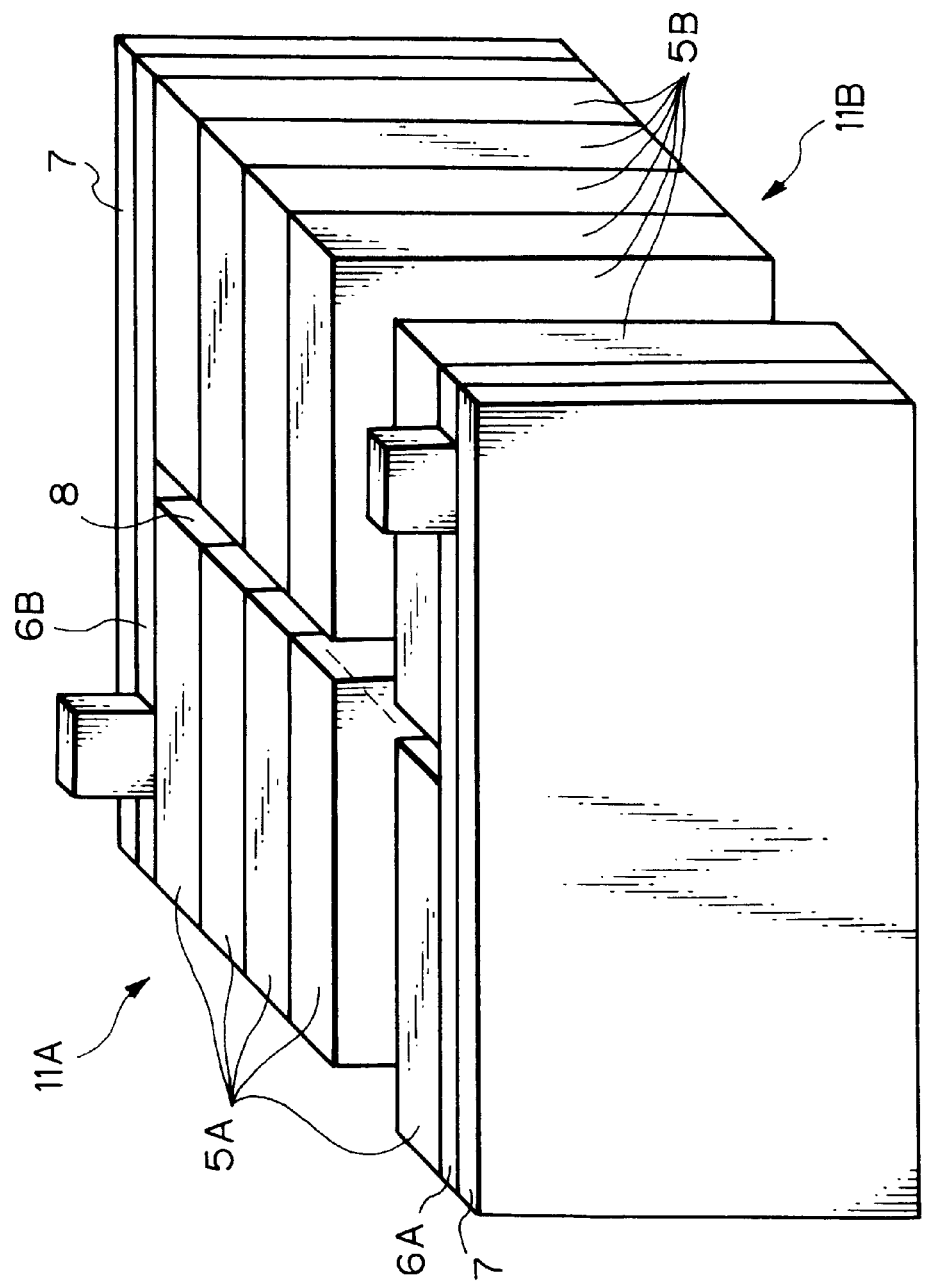
FIG. 5 is a perspective view showing a first embodiment of an electric double layer capacitor in accordance with the present invention.
Figure 6A:
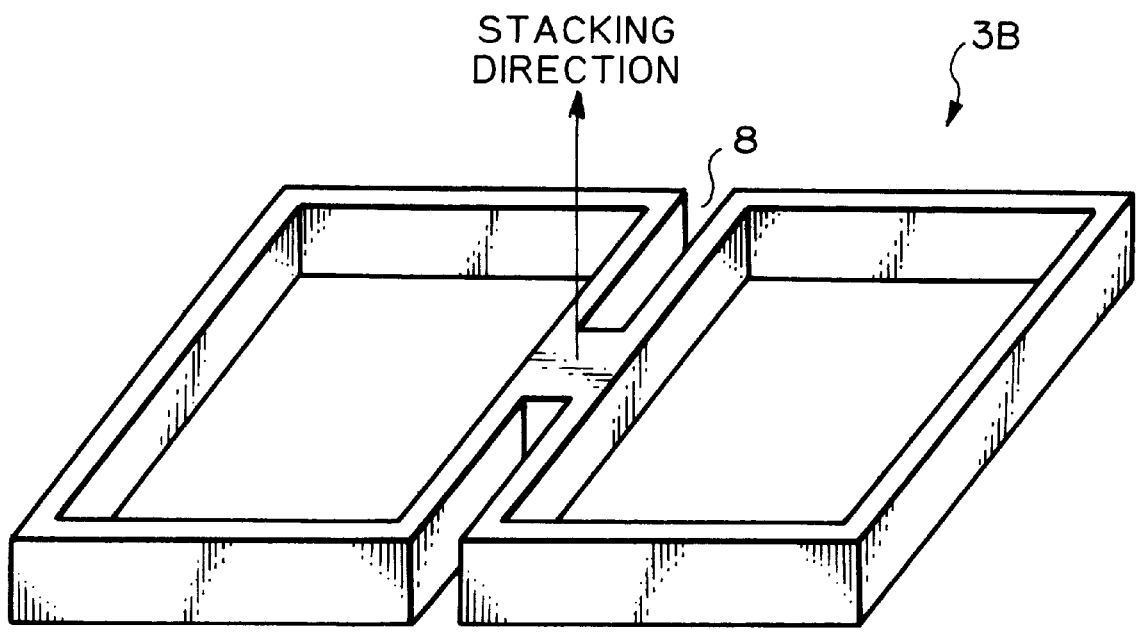
FIG. 6A is a perspective view showing a specific configuration of a gasket included in the first embodiment.

Referring to FIGS. 5 and 6A, an electric double layer capacitor embodying the present invention includes unit cells 5 each of which is identical with the unit cell 5 shown in FIG. 1 in that a pair of solid polarizing electrodes 1, FIG. 1, face each other with the intermediary of a porous separator 4, FIG. 1. In the illustrative embodiment, as shown in FIG. 6A, a gasket 3B has its surface perpendicular to the stacking direction configured generally in the form of a letter H. Two unit cells implemented as subcells 5A and 5B are arranged side by side in a plane perpendicular to the stacking direction and connected together by the respective gasket 3B. The polarizing electrodes 1 are formed of AC/C composite i.e., the activated carbon/polyacene composite taught in Japanese Patent Laid-Open Publication No. 4-288361. The activated charcoal may contain any kind of binder and may be produced by any kind of method so long as activated charcoal powder containing phenol resin or similar binder is baked to form a block.

The gasket 3B is used to seal the polarizing electrodes 1, current collecting members 2, FIG. 1, porous separator 4 and electrolyte, and therefore formed of plastics or similar insulator. In the illustrative embodiment, the gasket 3B is formed of heat-resistant ABS (acrylonitrile-butadiene-styrene) resin. The current collecting members 2 are formed of butyl rubber in which carbon powder or the like is kneaded. The porous separator 4 may be formed of any desired material so long as it is nonconductive and permeable to ions. In the embodiment, the separator 4 is implemented as a glass fiber separator for use in a lead storage battery.

The above capacitor is produced by the following procedure. The polarizing electrodes 1 are received in the gasket 3B in such a manner as to face each other with the intermediary of the porous separator 4. After an electrolyte has been filled in the electrodes 1 and separator 4, the current collecting members 2 are mounted to the gasket 3B. As a result, a unit cell having two subcells 5A and 5B connected together is produced. A desired number of such unit cells are serially stacked one upon the other, and then the right and left substacks 11A and 11B are electrically connected to each other via terminal electrodes 6A and 6B. Finally, a pair of pressing plates 7 are mounted to opposite ends of the substacks 11A and 11B, completing the capacitor.

In a sample, the polarizing electrodes 1 of the subcells 5A and 5B each was 35 mm long, 50 mm wide, and 1 mm thick. The subcells 5A and 5B each was 40 mm long, 60 mm wide, and 2.2 mm thick. The subcells 5A and 5B were spaced by a distance of 5 mm and were 5 mm thick at their contact portions. Eighteen unit cells each having the subcells 5A and 5B are serially stacked on each other in order to form the substacks 11A and 11B capable of withstanding a voltage of 15 V. In the illustrative embodiment, heat radiation channels 8 extend in the direction parallel to the stacking direction.

For the electrolyte, use was made of a 30 wt % aqueous solution of dilute sulfuric acid. The electrodes 1 were produced by mixing phenol-based activated charcoal powder and powdery phenol-based resin in a ratio of 70/30 in weight, and then pulverizing, granulating and baking the mixture.

2nd Embodiment

Figure 7:
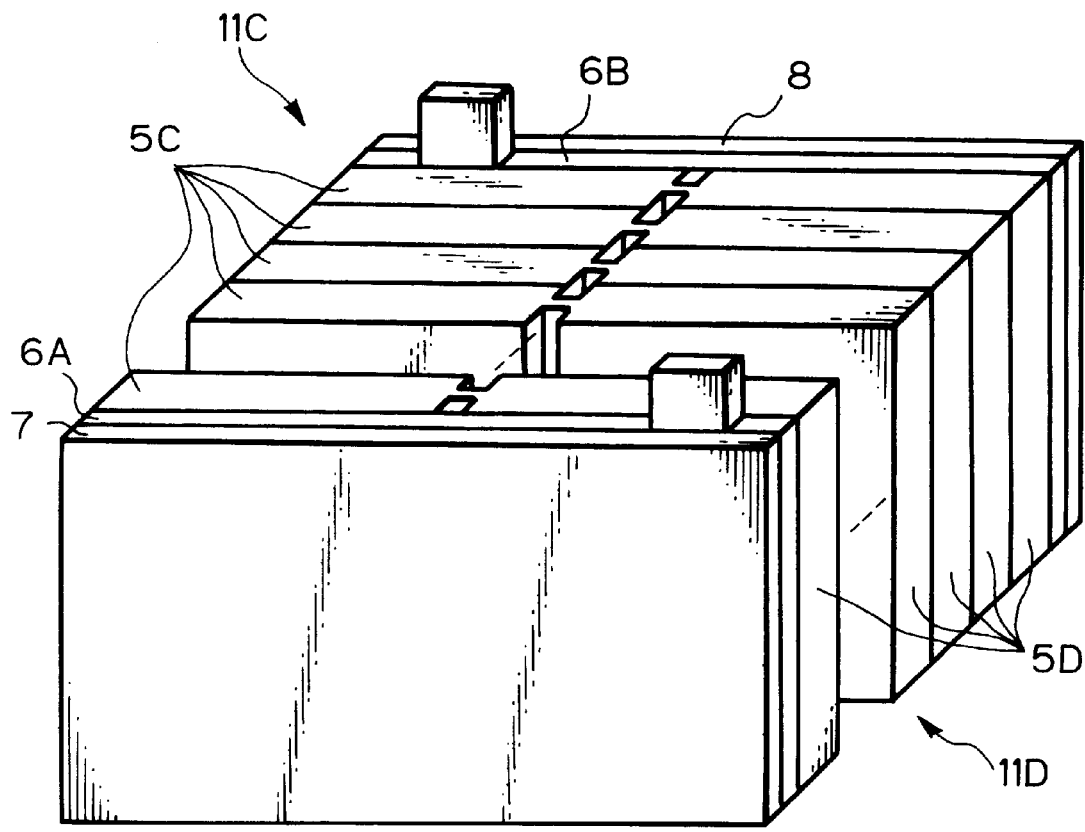
FIG. 7 is a perspective view showing a second embodiment of the present invention.
Figure 8:
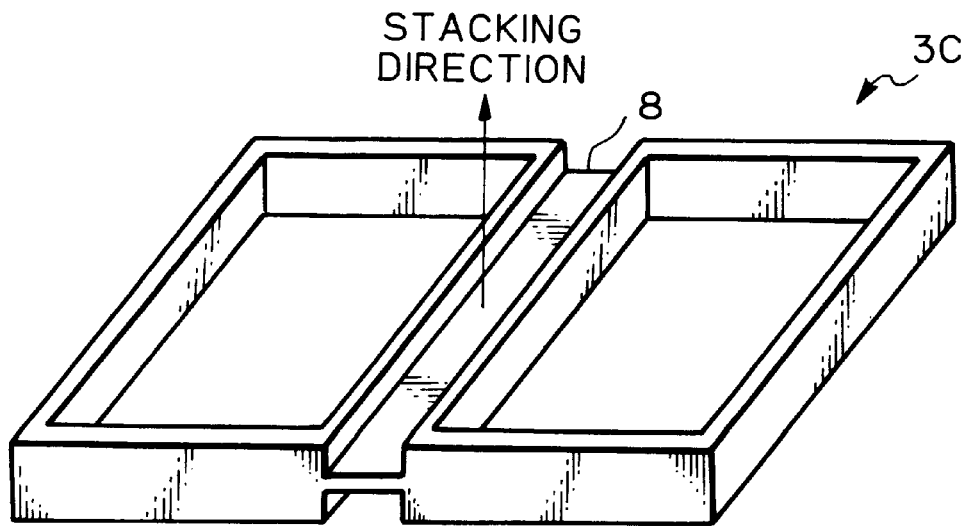
FIG. 8 is a perspective view showing a gasket included in the second embodiment.

Referring to FIGS. 7 and 8, an alternative embodiment of the present invention will be described. As shown in FIG. 7, a gasket 3C is formed with a pair of symmetrical recesses at its center such that the recesses play the role of the heat radiation channels 8. In this embodiment, the recesses extend in the direction perpendicular to the stacking direction. This embodiment is identical with the first embodiment as to the conditions and method for production.

In a sample, subcells 5C and 5D had the polarizing electrodes 1 thereof sized 35 mm long, 50 mm wide, and 1 mm thick. The subcells 5C and 5D each was 40 mm long, 60 mm wide, and 2.2 mm thick. The recesses 8 formed on the front and rear of each gasket 3C were 1 mm deep and 5 mm long, and each had a rectangular configuration. Eighteen unit cells each having the subcells 5C and 5D were serially stacked to produce the substacks 11C and 11D, as in the first embodiment. The withstanding voltage of the subcells 11C and 11D was 15 V.

The electrolyte used in the first embodiment was also used in the second embodiment.

3rd Embodiment

Figure 9:
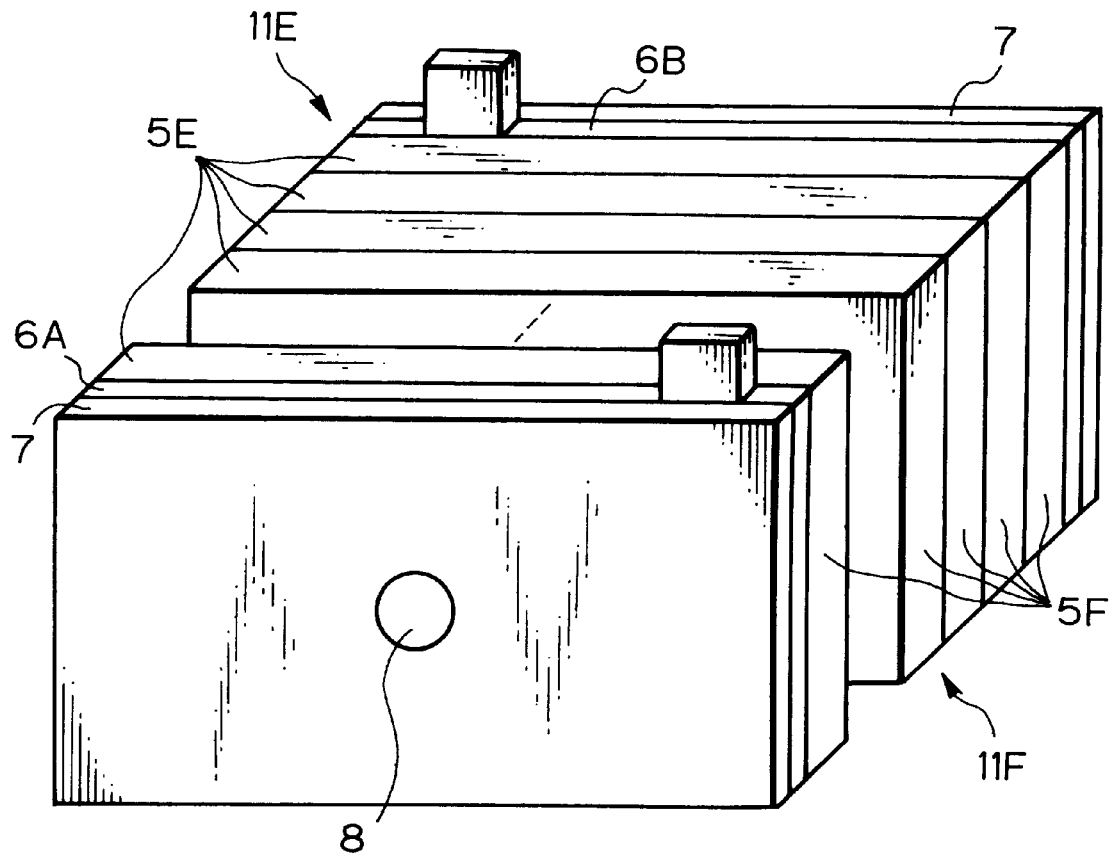
FIG. 9 is a perspective view showing a third embodiment of the present invention.
Figure 10:
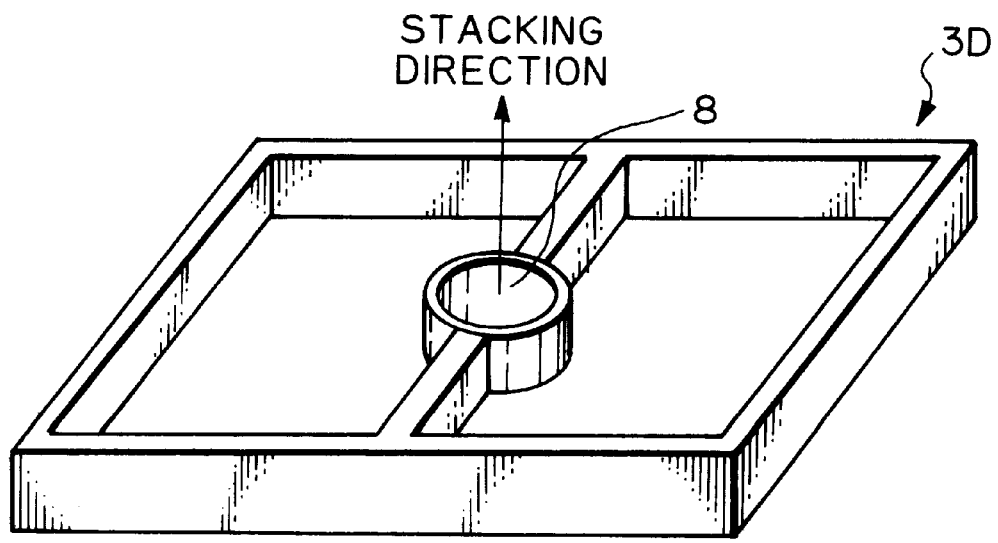
FIG. 10 is a perspective view showing a gasket applicable to the third embodiment and a fourth embodiment of the present invention.

FIGS. 9 and 10 show another alternative embodiment of the present invention. As shown in FIG. 10, a gasket 3D is formed with a hole 8 at the center of a plane perpendicular to the stacking direction of substacks 11E and 11F. As shown in FIG. 9, terminal electrodes 6A and 6B are also formed with holes of the same size as the holes 8 of the gaskets 3D. When the substacks 11E and 11F are assembled, the holes 8 of the gaskets 3D and those of the terminal electrodes 6A and 6B align with each other, forming a heat radiation channel. This embodiment is identical with the first and second embodiments as to the conditions and method for production.

In a sample, the polarizing electrodes 1 of the subcells 5E and 5F each was 35 mm long, 50 mm wide, and 1 mm thick. The subcells 5E and 5F each was 40 mm long, 60 mm wide, and 2.2 mm thick. The holes 8 had a diameter of 5 mm each.

The electrolyte used in the first and second embodiments was also used in the third embodiment.

4th Embodiment

Figure 11:
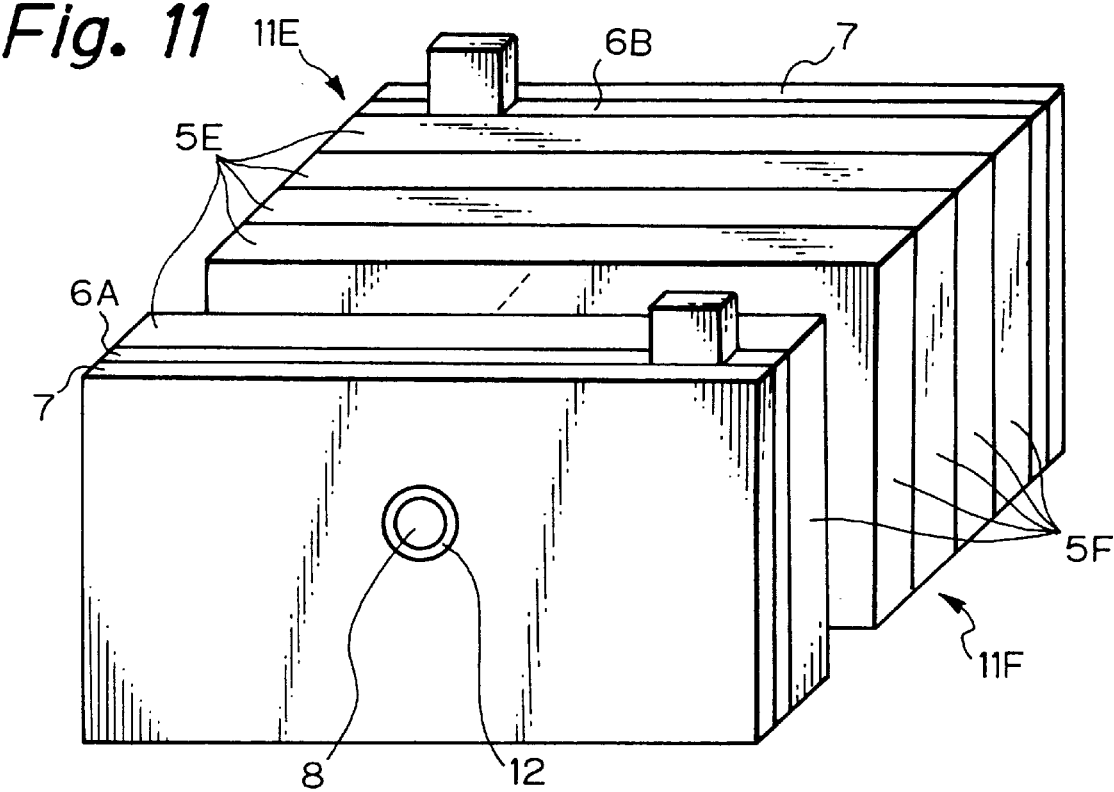
FIG. 11 is a perspective view showing the fourth embodiment of the present invention.

FIG. 11 shows a further alternative embodiment of the present invention. This embodiment is identical with the first to third embodiments as to the conditions and method for production. As shown, this embodiment is the same as the third embodiment except that a cylindrical pipe 12 is received in the aligned holes 8 of the gaskets 3D and those of the terminal electrodes 6A and 6B. The pipe 12 is made of Fe, Cu. Al, Bs or similar metal having high heat conductivity. In a specific configuration, the pipe 12 had an outside diameter of 5 mm and an inside diameter of 3.5 mm.

The walls of the holes formed in the terminal electrodes 6A were covered with insulating resin in order to prevent the electrodes 6A from being electrically connected by the pipe 12.

1st Comparative Example

Figure 2:
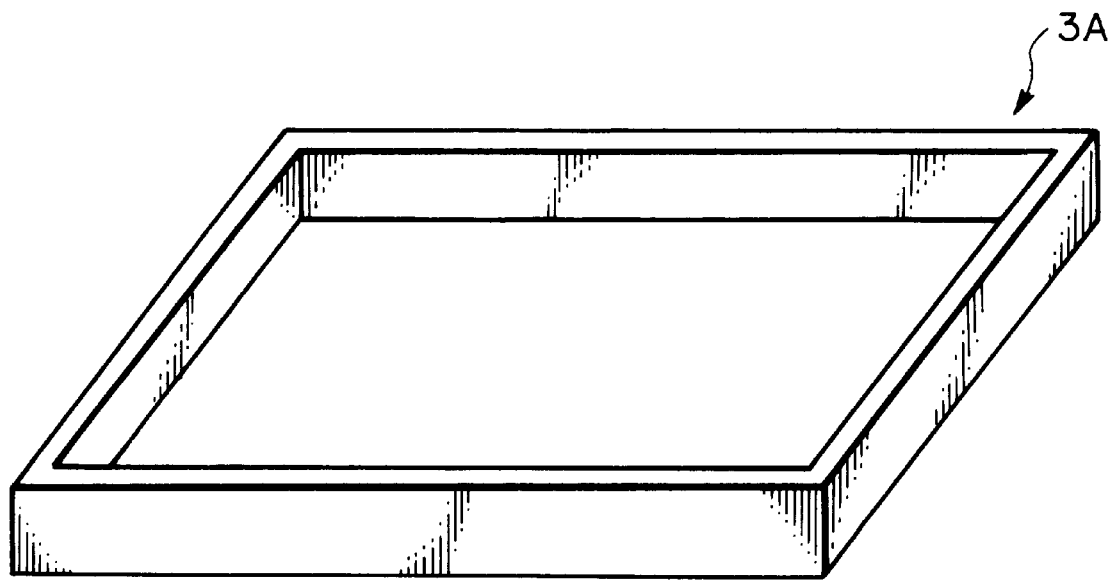
FIG. 2 is a perspective view showing a gasket also included in the conventional capacitor.

The gasket 3A shown in FIG. 2 was used to produce the capacitor shown in FIG. 3. This comparative example is identical with the first to third embodiments as to the conditions and method for production.

In a sample, the polarizing electrodes 1 each was 70 mm long, 50 mm wide, and 4 mm thick white each unit cell 5 was 85 mm long, 60 mm wide, and 2.2 mm thick. Eighteen unit cells 5 each having such a configuration were serially stacked together in order to produce the cell stack 11 whose withstanding voltage was 15 V.

The electrolyte used in the first to third embodiment was also used in the above comparative example.

2nd Comparative Example

Figure 12:
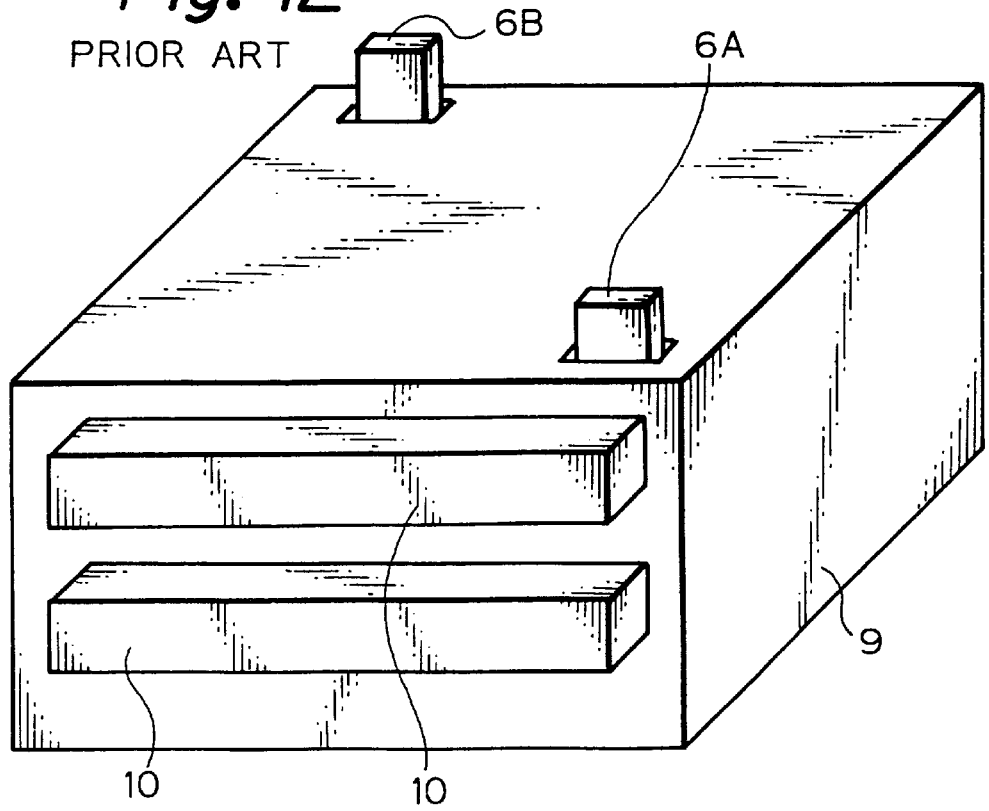
FIG. 12 is a perspective view showing an electric double layer capacitor implemented with the gasket of FIG. 2 and representative of a second comparative example.

The gasket 3A shown in FIG. 2 was used to produce an electric double layer capacitor shown in FIG. 12. The capacitor is identical with the first to third embodiments as to the conditions and method for production. Specifically, in this comparative example, the capacitor identical in configuration with the capacitor of the first comparative example was received in a casing 9. Subsequently, heat radiators 10 were welded, soldered or otherwise affixed to a surface of the casing 9 perpendicular to the stacking direction of the unit cells 5. The casing 9 and heat radiators 10 were formed of iron having inherently high heat conductivity. The peripheries of the terminal electrodes 6A and 6B were covered with insulating resin so as to be protected from shorting with the casing 9.

Reliability tests were conducted with the capacitors produced by the first to fourth embodiments and the capacitors produced by the first and second comparative examples. Specifically, the capacitors each was cyclically charged and discharged; a single cycle consisted of applying a charge voltage of 15 V for 10 seconds and then shorting the terminals for 10 seconds. For each of the embodiments and comparative examples, thirty samples were prepared as a standard. Table 1 shown below lists the cumulative number of defective samples.

TABLE 1

| CAPACITOR | NUMBER OF CYCLES | | | |
|---|---|---|---|---|
| | $10^1$ | $10^2$ | $10^3$ | $10^4$ |
| 1ST EMBODIMENT | 0 | 0 | 0 | 0 |
| 2ND EMBODIMENT | 0 | 0 | 0 | 0 |
| 3RD EMBODIMENT | 0 | 0 | 0 | 0 |
| 4TH EMBODIMENT | 0 | 0 | 0 | 0 |
| 1ST COMPARATIVE EXAMPLE | 1 | 9 | 30 | 30 |
| 2ND COMPARATIVE EXAMPLE | 0 | 3 | 13 | 30 |

As shown in Table 1, all the samples were broken in less than 103 cycles in the first comparative example or in less than 104 cycles in the second comparative example due to an increase in ESR. By contrast, all the samples of the first to fourth embodiments were operable in more than 104 cycles. Why the second comparative example was superior to the first comparative example in reliability is presumably because the heat radiators affixed to the casing 9 promoted heat radiation.

The first to fourth embodiments are more reliable than the second comparative example presumably for the following reason. In the second comparative example, a substantial period of time is necessary for heat generated in the capacitor to be transferred to the casing 9 and therefrom to the heat radiators 10. Therefore, the heat radiation efficiently is low, causing the heat to accumulate in the capacitor. By contrast, in the first to fourth embodiments, heat generated in the individual subcell is radiated via the holes 8 formed in the center of the substacks 11A–11F. This realizes a heat radiation efficiency high enough to prevent the heat from accumulating despite the repeated charging and discharging, and thereby enhances reliability.

Figure 6B:
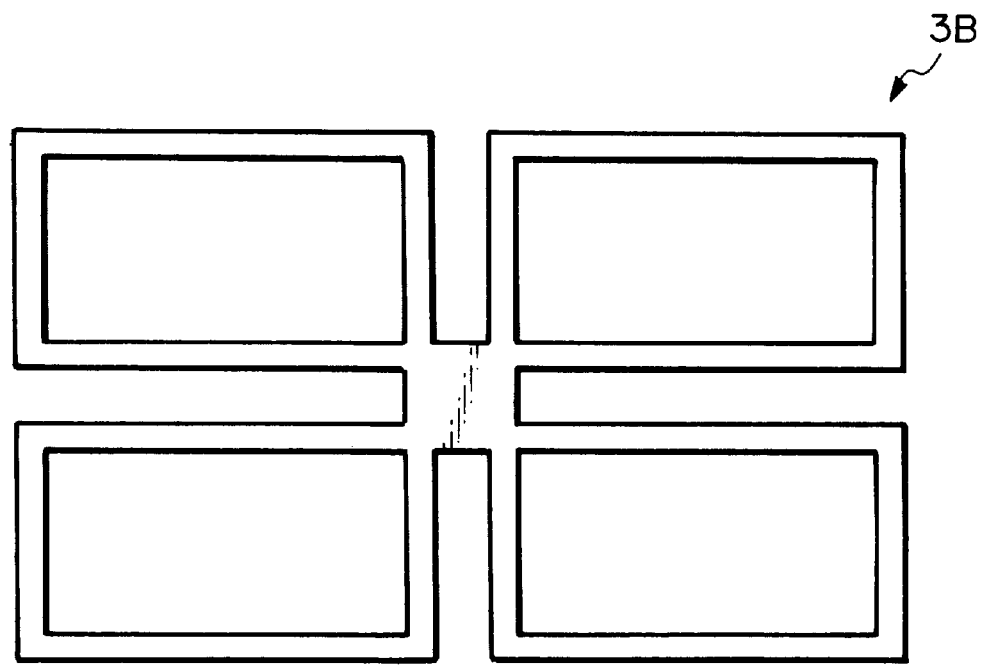
FIG. 6B is a plan view showing another specific configuration of the gasket included in the first embodiment.

In FIG. 6A, the gasket 3B has a generally H-shaped configuration, as seen in a plan view. Alternatively, as shown in FIG. 6B, the gasket 3B may be provided with four sections each for receiving the polarizing electrodes.

In summary, it will be seen that the present invention provides an electric double layer capacitor having various unprecedented advantages, as enumerated below.

(1) The capacitor has a high heat radiation efficiency and therefore high reliability because heat radiated by the individual cell is radiated via a hole formed in the center of a cell stack.

(2) The capacitor is small size and light weight because it does not need a heavy and bulky heat radiator. In addition, two substacks of subcells are arranged at both sides of the hole and electrically connected in parallel by terminal electrodes, so that the thickness of the polarizing electrodes can be reduced.

(3) The capacitor can be produced easily with high productivity because the unique configuration of each gasket allows the capacitor to be produced by the conventional procedure without increasing the number of steps.

Various modifications will become possible for those skilled in the art after receiving the teachings of the present disclosure without departing from the scope thereof.

What is claimed is:

1. In a double layer capacitor with plural unit cells in a longitudinally aligned stack, where each of said unit cells includes a pair of polarizing electrodes with a porous separator therebetween, a pair of current collectors, each contacting a surface of a respective one of said electrodes that is opposite another surface facing said separator, and a protective gasket surrounding said pair of electrodes, said gasket comprising a partition separating a space surrounded by said gasket into plural spaces, the improvement comprising said stack of unit cells having at least one exterior longitudinal side with a continuous longitudinal cooling notch therein that opens to an exterior of said capacitor, said cooling notch extending into said partition of each of said cells.

2. The improvement of claim 1, wherein said at least one exterior longitudinal side has two sides, and wherein said partition divides said unit cells into two spaces, and further comprising two of said continuous longitudinal cooling notches in opposite ones of said exterior longitudinal sides.

3. The improvement of claim 1, wherein said at least one exterior longitudinal side has four sides, and wherein said partition divides said unit cells into four spaces, and further comprising four of said continuous longitudinal cooling notches in each of said exterior longitudinal sides.

4. In a double layer capacitor with plural unit cells in a longitudinally aligned stack, where each of said unit cells includes a pair of polarizing electrodes with a porous separator therebetween, a pair of current collectors, each contacting a surface of a respective one of said electrodes that is opposite another surface facing said separator, and a protective gasket surrounding said pair of electrodes, said gasket comprising a partition separating a space surrounded by said gasket into plural spaces, the improvement comprising said stack of unit cells having two opposing longitudinal exterior sides with plural cooling notches therein that open to an exterior of said capacitor, each of said cooling notches being a depression in a respective one of said partition that extends completely across the respective partition, so that each of said cooling notches extends laterally completely through an interior of said capacitor and opens to opposing ones of said longitudinal exterior sides of the capacitor.

5. The improvement of claim 4, wherein each of said partition has said depressions in opposing faces of said partition so that each of said notches is between one pair of adjacent ones of said unit cells and is formed by said depressions in two of the adjacent unit cells.

* * * * *